United States Patent
Hioki et al.

(10) Patent No.: US 7,951,031 B2
(45) Date of Patent: May 31, 2011

(54) CHAIN GUIDE OF STRADDLE TYPE ALL TERRAIN VEHICLE

(75) Inventors: Yuzo Hioki, Hamamatsu (JP); Tetsuharu Nojiri, Hamamatsu (JP)

(73) Assignee: Suzuki Kabushiki Kaisha (JP)

( * ) Notice: Subject to any disclaimer, the term of this patent is extended or adjusted under 35 U.S.C. 154(b) by 9 days.

(21) Appl. No.: 11/950,262

(22) Filed: Dec. 4, 2007

(65) Prior Publication Data

US 2008/0139355 A1 Jun. 12, 2008

(30) Foreign Application Priority Data

Dec. 7, 2006 (JP) .................................. 2006-330402

(51) Int. Cl.
*F16H 7/18* (2006.01)
(52) U.S. Cl. ........ 474/140; 474/144; 474/146; 474/163; 123/198 E; 280/124.128; 280/260; 280/276; 280/284
(58) Field of Classification Search .................... 474/14, 474/140, 144
See application file for complete search history.

(56) References Cited

U.S. PATENT DOCUMENTS

| 966,391 | A | * | 8/1910 | Fillingham | 474/144 |
| RE28,335 | E | * | 2/1975 | Wood | 180/219 |
| 5,064,016 | A | * | 11/1991 | Iwai et al. | 180/215 |
| 5,067,930 | A | * | 11/1991 | Morales | 474/144 |
| 5,445,568 | A | * | 8/1995 | Fukuzawa et al. | 474/144 |
| 2006/0264284 | A1 | * | 11/2006 | Iwaki | 474/140 |

FOREIGN PATENT DOCUMENTS

FR 2733812 A1 * 11/1996
JP 57-24620 S 12/2007

* cited by examiner

*Primary Examiner* — Robert A Siconolfi
*Assistant Examiner* — San Aung
(74) *Attorney, Agent, or Firm* — Barnes & Thornburg LLP

(57) ABSTRACT

A straddle type all terrain vehicle is provided with a chain guide for covering an outer peripheral edge of at least an engaged portion of a driven sprocket with a drive chain from outside in a radial direction inside a chain cover. A rear axle housing is formed with upper and lower flange portions extending upward and downward at opposite end portions in the vehicle width direction of the rear axle housing. The rear axle housing is coupled to a rear end portion of the rear swing arm for swinging forward and rearward about mounted portions of the upper flange portion. The chain cover is mounted on the swing arm side and the chain guide is mounted on the rear axle housing side, respectively.

4 Claims, 3 Drawing Sheets

CHAIN GUIDE OF STRADDLE TYPE ALL TERRAIN VEHICLE

This application is based upon and claims the benefit of priority from the prior Japanese Patent Application JP2006-330402 filed on Dec. 7, 2006, the entire contents of which is incorporated herein by reference.

BACKGROUND OF THE INVENTION

1. Field of the Invention

The present invention relates to a chain guide of a straddle type all terrain vehicle (ATV).

2. Related Art

There is known a looped-over power transmission device using a drive chain as means for transmitting power of an engine to driving wheels (e.g., rear wheels). The looped-over power transmission device is formed by looping the drive chain over between a drive sprocket on an engine side and a driven sprocket on a driving wheel side, and such power transmission device is used in many kinds of vehicles.

Incidentally, the drive chain may elongate during use. The looped-over power transmission device using the drive chain includes a tension side on which the drive chain is stretched to transmit power and a slack side on which the drive chain circulates depending on a power transmitting direction.

On the tension side of the drive chain, tension is always applied, and therefore, a skip does not occur. However, the slack-side drive chain suddenly turns in direction at a portion where the chain is engaged with the driven sprocket, and therefore, the chain may lift outward in a radial direction of the sprocket in a waving manner under the influence of an inertial force and a part of the chain may be disengaged from the sprocket in some cases. Especially, when a transmission load suddenly increases or decreases under the influence of abrupt acceleration of the vehicle or a condition of a road surface, the tension-side drive chain elongates and contracts, and strength of the slack side changes to cause a flutter of the chain to thereby further encourage the skip phenomenon.

Therefore, in order to prevent such a skip of the drive chain, a protector may be disposed at a regular distance from an outer periphery of a sprocket as shown, for example, in Japanese Utility Model Application Publication No. 57-24620.

In a case of a vehicle such as a straddle type all terrain vehicle intended for traveling on a muddy ground or a rough road that is not leveled, wear of links and coupling pins develops and thereby reduces durability when mud or muddy water sticks to the drive chain for transmitting power of the engine to the rear wheels. The whole drive chain is covered with a chain cover to avoid such adverse phenomenon.

However, if the driven sprocket is displaced to adjust the tension in the drive chain suffering the elongation during the use as described above, complicated operation such as removal and moving of the chain cover is required. Similarly, it is required to move or adjust the protector for preventing the skip of the drive chain, further complicating the operation.

SUMMARY OF THE INVENTION

The present invention was conceived in consideration of the circumstances mentioned above and an object thereof is to provide a chain guide of a straddle type all terrain vehicle in which a skip of the drive chain can be prevented from occurring with a simple structure.

The above and other objects can be achieved according to the present invention by providing a chain guide of a straddle type all terrain vehicle, the straddle type all terrain vehicle being provided with: a vehicle body frame, an engine mounted to a vehicle body frame; a rear swing arm supported at a front end on the vehicle body frame and extending toward a rear side of a vehicle body; a cylindrical rear axle housing coupled to a rear end portion of the rear swing arm to be adjustable in a front-rear direction and extending in a vehicle width direction; a rear axle axially supported for rotation by the rear axle housing, extending in the vehicle width direction, and mounted at both opposite end portions with rear wheels; a driven sprocket disposed on the rear axle for rotating integrally; a drive chain looped over between the driven sprocket and a drive sprocket driven by the engine; a chain cover for covering the driven sprocket and the drive chain; and a chain guide for covering an outer peripheral edge of at least an engaged portion of the driven sprocket with the drive chain from outside in a radial direction inside the chain cover, wherein the rear axle housing is provided with upper and lower flange portions extending upward and downward at opposite end portions in the vehicle width direction of the rear axle housing, the rear axle housing is coupled to a rear end portion of the rear swing arm for swinging forward and rearward about mounted portions of the upper flange portion, and the chain cover is mounted on the swing arm side and the chain guide is mounted on the rear axle housing side, respectively.

In a preferred embodiment, it may be desired that the chain guide is formed by bending a bar having a circular cross section.

It may be also desired that an introducing portion curved downward is integrally formed with a front end portion of a lower end portion of the chain guide positioned on an engaged side of the drive chain with the driven sprocket.

According to chain guide of the straddle type all terrain vehicle of the structures mentioned above, it is possible to prevent a skip of the drive chain with a simple structure. Furthermore, an operation for adjusting tension in the drive chain may become easy.

In addition, noise due to dashing of the drive chain against the chain cover does not occur, and durability of the drive chain and the chain guide increases. Moreover, the drive chain and the driven sprocket can be smoothly engaged.

The nature and further characteristic features of the present invention will be made clearer from the following descriptions made with reference to the accompanying drawings.

DESCRIPTION OF THE PREFERRED EMBODIMENT

A preferred embodiment of the present invention will be described hereunder with reference to the accompanying drawings. Further, it is to be noted that terms "upper", "lower", "right", "left" and the like terms are used herein with reference to the illustration on the drawings or in a generally usable state of a vehicle.

Figure 1:
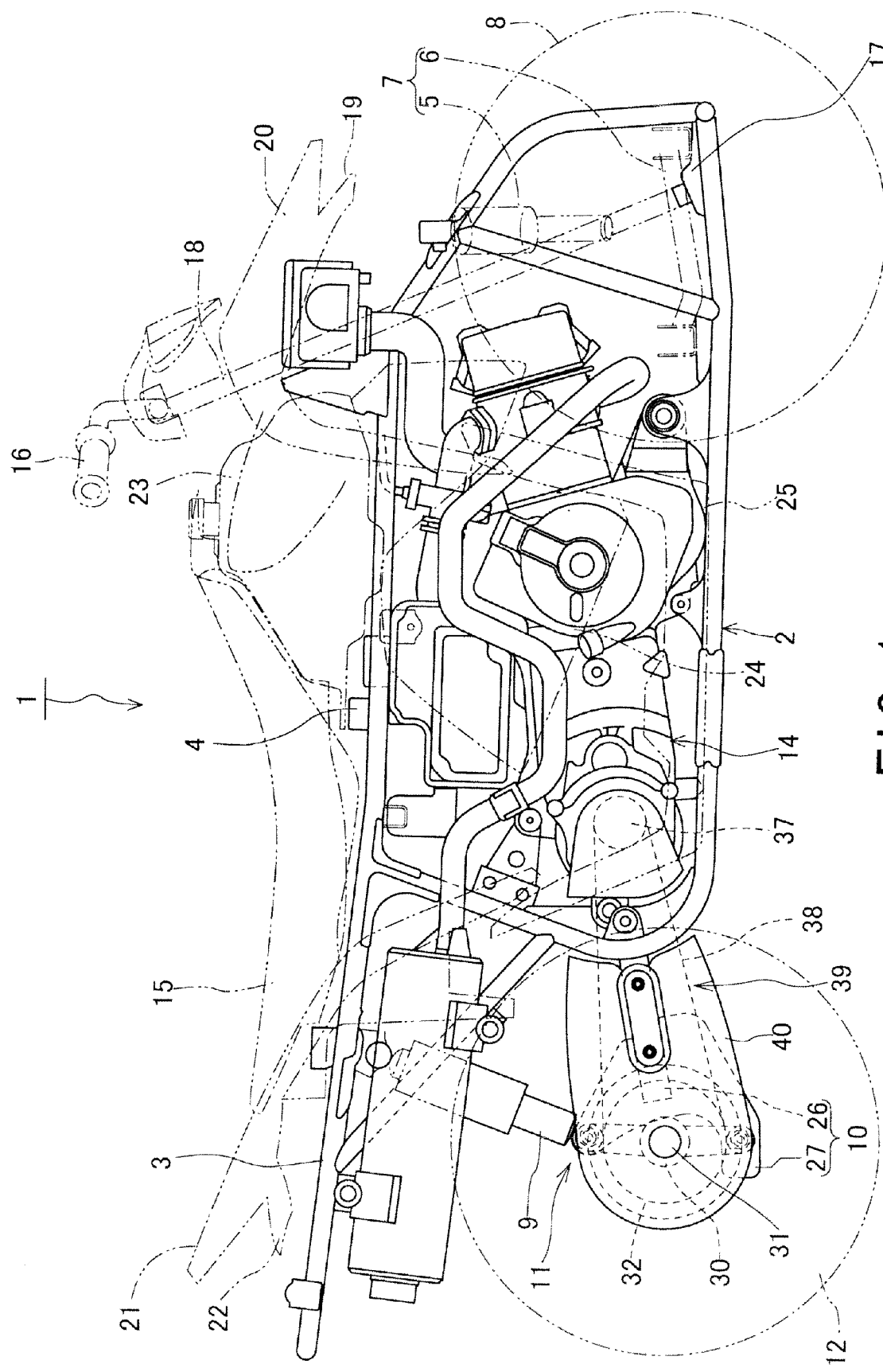
FIG. 1 is a right side perspective view of a straddle type all terrain vehicle representing an embodiment of a chain guide of the straddle type all terrain vehicle according to the present invention.

As shown in FIG. 1 representing an embodiment of a straddle type all terrain vehicle to which the present invention is applied, the straddle type all terrain vehicle 1 includes a vehicle body frame 2 made of a steel pipe, for example. The vehicle body frame 2 is formed in a shape similar to a cage including a pair of left and right frame members 3, a plurality of bridge members 4 for coupling the frame members 3 in a vehicle width direction.

At a front portion of the vehicle body frame 2, a pair of left and right front wheels 8 having wide low-pressure tires are mounted through front suspension mechanisms 7 formed of front shock absorbers 5 and front swing arms 6.

On the other hand, at a rear portion of the vehicle body frame 2, a pair of left and right rear wheels 12 having wide low-pressure tires are mounted through rear suspension mechanisms 11 formed of rear shock absorbers 9 and a rear swing arms 10.

An engine 14 is mounted between the front and rear wheels 8 and 12 at a lower portion of a substantially central portion of the vehicle body frame 2. A straddle type seat 15, which a driver straddles, is disposed behind and above the engine 14, and a handle bar 16 as a steering device of the vehicle 1 is provided in front of the seat 15. Further, a steering shaft 18 extends from the handle bar 16 toward a steering device support portion 17 provided at a front lower portion of the vehicle body frame 2.

A front cover 19 for covering a front upper portion of the vehicle body frame 2 is attached to a front portion of the vehicle body, and front fenders 20 for covering the left and right front wheels 8 are formed integrally or substantially integrally.

On the other hand, a rear cover 21 for covering a rear upper portion of the vehicle body frame 2 is attached to a rear portion of the vehicle body, and rear fenders 22 for covering the left and right rear wheels 12 are formed integrally or substantially integrally. Furthermore, a fuel tank 23 is disposed above the engine 14.

Furthermore, side covers 24 and step floors 25 are provided on the sides of the engine 14 and between the front fenders 20 and the rear fenders 22. These covers are synthetic resin molded products, for example.

Figure 2:
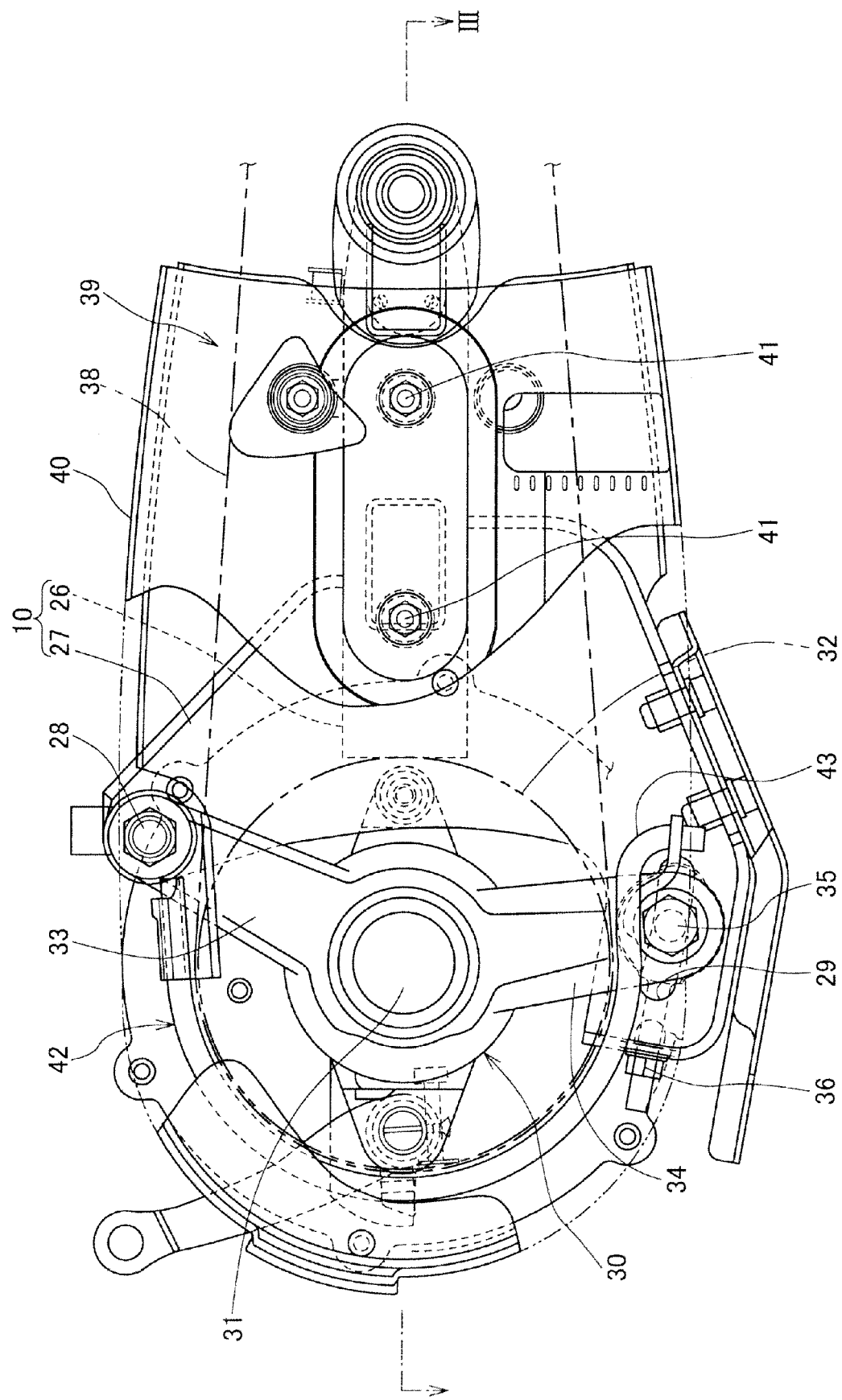
FIG. 2 is an enlarged right side view of a portion around a rear swing arm of the vehicle of FIG. 1.
Figure 3:
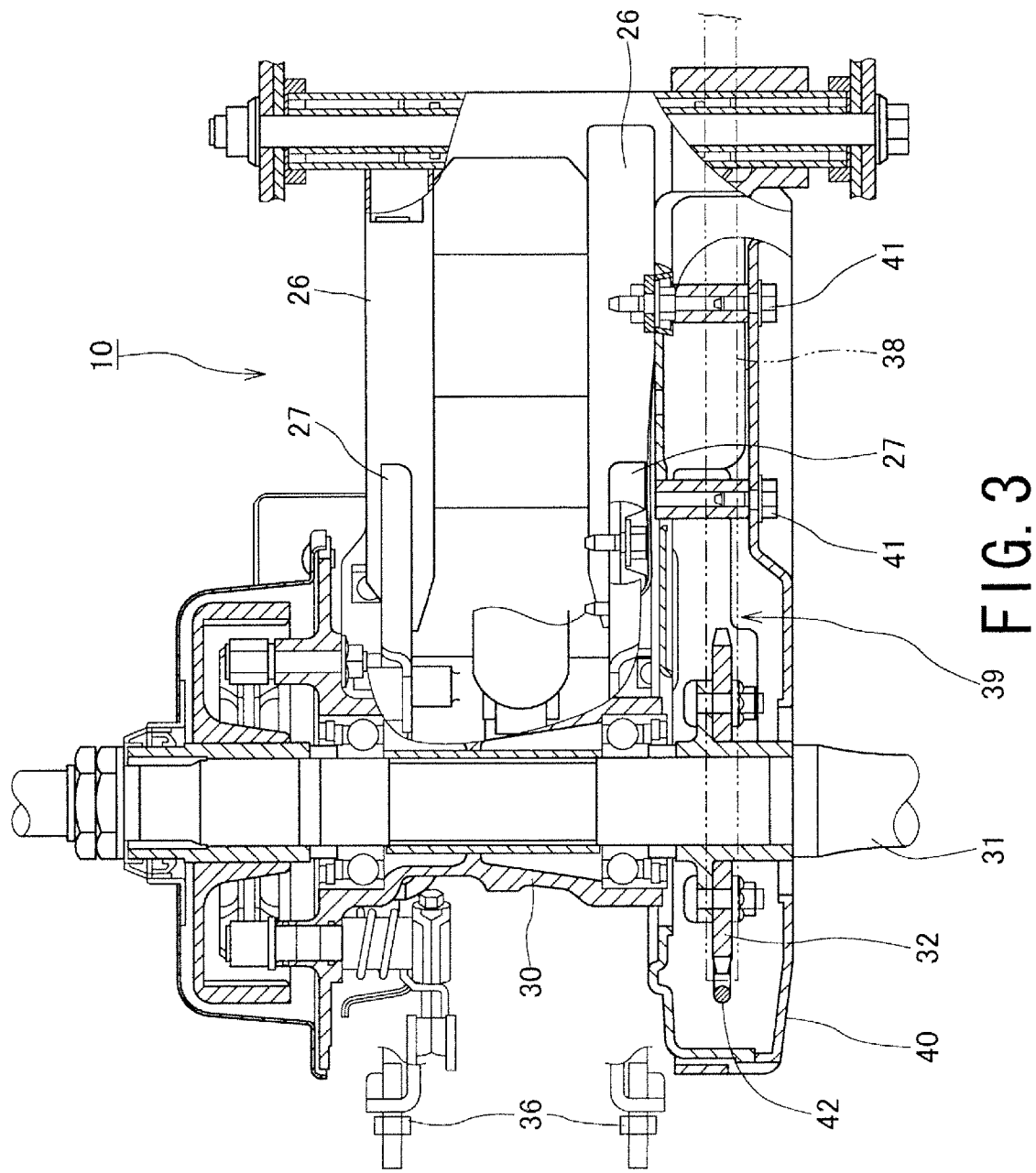
FIG. 3 is a sectional view taken along the line III-III in FIG. 2.

Next, with reference to FIGS. 1 to 3, the rear swing arm 10 includes a pair of left and right arm portions 26. Front ends of these arm portions 26 are pivoted to the vehicle body frame 2 for swinging vertically and extend rearward. Further, swing arm plates 27 extending in a vertical direction are provided at rear end portions of the arm portions 26. Lower end portions of the rear shock absorbers 9 are axially supported by bolts 28 at upper end portions of the swing arm plates 27, for example, and o the other hand, at lower end portions of the swing arm plates 27, elongated holes 29 in shapes of arcs are formed in a front-rear direction, the arcs having their centers at the portions of the upper end portions of the swing arm plates 27 where the rear shock absorbers 9 are axially supported.

A cylindrical rear axle housing 30 extending in a vehicle width direction is disposed at the rear portion of the swing arm plates 27 forming the rear swing arm 10. The rear axle housing 30 axially supports a rear axle 31 extending in the vehicle width direction in the housing 30. The rear wheels 12 are mounted to opposite ends of the rear axle 31.

On one side in the vehicle width direction of the rear axle 31 (right side in a direction of travel of the vehicle 1 in the embodiment), a driven sprocket 32 is provided for rotating integrally.

The rear axle housing 30 includes flange portions 33 and 34 jutting out upward and downward at its opposite end portions in the vehicle width direction. End portions of the upper flange portions 33 are fastened by the bolts 28 to the swing arm plates 27 together with the lower end portions of the rear shock absorbers 9. The rear axle housing 30 is coupled to a rear end portion of the rear swing arm 10 for swinging forward and rearward about the mounted portions of the upper flange portions 33.

On the other hand, end portions of the lower flange portions 34 are fastened by bolts 35, for example, to the arc-shaped elongated holes 29 formed at the lower end portions of the swing arm plates 27. The rear axle housing 30 can move (swing) forward and rearward in ranges of the elongated holes 29 about the axially supported portions of the flange portions 33 at the upper end portions of the swing arm plates 27. The rear axle housing 30 in the front-rear direction is positioned by using adjusters 36 provided in vicinities of the elongated holes 29.

As shown in FIG. 1, on a rear side of the engine 14 on which the driven sprocket 32 is disposed (right side in the direction of travel of the vehicle 1 in the embodiment), a final output shaft end, not shown, of the engine 14 protrudes, and a drive sprocket 37 is attached to the protruding end for rotating integrally.

A drive chain 38 is looped over between the drive sprocket 37 and the driven sprocket 32 provided to the rear axle 31 so as to form a looped-over power transmission device 39.

Most portions of the drive chain 38 exposed at the rear portion of the vehicle body frame 2 (engine 14) and the driven sprocket 32 are covered with a chain cover 40 so as to surround the same. The chain cover 40 is fixed to a side surface of the arm portion 26 of the rear swing arm 10 by means of bolts 41, for example.

Inside the chain cover 40, a chain guide 42 is provided so as to cover an outer peripheral edge of at least a portion of the driven sprocket 32 engaged with the drive chain 38 from the outside in a radial direction. The chain guide 42 is formed by bending a metal round bar, for example, having a circular cross section. An upper end portion of the chain guide 42 is fixed to the upper flange portion 33 of the rear axle housing 30 and a lower end portion of the chain guide 42 is fixed to the lower flange portion 34 of the rear axle housing 30, respectively. A front end portion of a lower end portion of the chain guide 42 positioned on an engaged side of the drive chain 38 with the driven sprocket 32 is curved downward to integrally form an introducing portion 43.

Next, operation of the embodiment will be described.

The chain cover 40 for covering the drive chain 38 and the driven sprocket 32 forming the looped-over power transmission device 39 is fixed to the rear swing arm 10 side and the chain guide 42 for preventing the skip of the drive chain 38 is provided on a side of the rear axle housing 30 mounted to be movable with respect to the rear swing arm 10. Therefore, the respective structures can be simplified. Furthermore, the chain cover 40 need not be displaced for each adjustment of the tension in the drive chain 38 and therefore the operation becomes easy. Moreover, the drive chain 38 does not come in contact with the chain cover 40 having a large plate-shaped plane and therefore noise due to dashing of the chain does not occur.

Furthermore, because the chain guide 42 is formed by bending the bar having the circular cross section, the drive chain 38 and the chain guide 42 come in point contact with each other and therefore durability of the drive chain 38 and the chain guide 42 is improved.

Moreover, the introducing portion 43 curved downward is integrally formed with the front end portion of the lower end portion of the chain guide 42 positioned on the engaged side of the drive chain 38 with the driven sprocket 32 and therefore engagement of the drive chain 38 with the driven sprocket 32 can be performed smoothly.

What is claimed is:

1. A chain guide of a straddle type all terrain vehicle, which is provided with:
    a vehicle body frame;
    an engine mounted to the vehicle body frame;
    a rear swing arm supported at a front end on the vehicle body frame and extending toward a rear side of the vehicle body frame;
    a cylindrical rear axle housing coupled to a rear end portion of the rear swing arm to be adjustable in a front-rear direction and extending in a vehicle width direction;
    a rear axle axially supported for rotation by a rear axle housing, extending in the vehicle width direction, and mounted at both opposite end portions with rear wheels;
    a driven sprocket disposed on the rear axle for rotating integrally;
    a drive chain looped over and between the driven sprocket and a drive sprocket and driven by the engine;
    a chain cover for covering the driven sprocket and the drive chain; and
    a chain guide for covering an outer peripheral edge of at least an engaged portion of the driven sprocket with the drive chain from outside in a radial direction inside the chain cover, the chain guide having an upper end portion and lower end portion,
    wherein the rear axle housing is provided with upper and lower flange portions extending upward and downward at opposite end portions in the vehicle width direction of the rear axle housing,
    wherein the upper end portion of the chain guide is fixed to the upper flange portion, the lower end portion of the chain guide is fixed to the lower flange portion so that the chain guide is extending upward and downward with respect to the rear axle housing,
    wherein the rear axle housing is coupled to a rear end portion of the rear swing arm for swinging forward and rearward about mounted portions of the upper flange portion, and
    wherein the chain cover is mounted on the swing arm side and the chain guide is mounted on the rear axle housing side, respectively.

2. The chain guide of a straddle type terrain vehicle according to claim 1, wherein the chain guide comprises a bent bar having a circular cross section.

3. The chain guide of a straddle type all terrain vehicle according to claim 1, wherein an introducing portion curved downward is integrally formed with a front end portion of a lower end portion of the chain guide positioned on an engaged side of the chain with the driven sprocket.

4. The chain guide of a straddle type all terrain vehicle according to claim 2, wherein the chain guide comprises a semi-circular shape.

* * * * *